United States Patent [19]

Kahn et al.

[11] 4,396,997
[45] Aug. 2, 1983

[54] LIQUID CRYSTAL INFORMATION STORAGE AND RETRIEVAL SYSTEM

[75] Inventors: Frederic J. Kahn; Henryk Birecki, both of Palo Alto; Robert A. Burmeister, Saratoga, all of Calif.

[73] Assignee: Hewlett-Packard Company, Palo Alto, Calif.

[21] Appl. No.: 267,275

[22] Filed: May 26, 1981

[51] Int. Cl.³ ............................................. G11C 13/08
[52] U.S. Cl. .................................. 365/108; 340/784; 350/351
[58] Field of Search ........................ 365/108; 340/784; 350/330, 334, 350 S, 351

[56] References Cited

U.S. PATENT DOCUMENTS 3,775,757 11/1973 Taylor et al. ...................... 365/108
3,796,999 3/1974 Kahn ................................. 365/108
4,040,047 8/1977 Hareng et al. ...................... 365/108

OTHER PUBLICATIONS

Bleha et al., AC-Driven Photoactivated Liquid Crystal Light Valve, Conf:S4386 0060 1973 SID International Symposium Digest of Tech. Papers, N.Y., 5/15-17/73, pp. 42–43.
Melchior et al., Thermally Addressed Electrically Evased High-resolution Liquid-Crystal Light Valves, Appl. Phys. Lett. vol. 21, No. 8, 10/15/72, pp. 392-394, S28230057.
Cunningham et al. Absorbing Films for Reflective Laser Addressed, Thermally Activated Liquid Crystal Cell, IBM Tech. Disc. Bul., vol. 18, No. 11, 4/76, p. 3776.

*Primary Examiner*—Stuart M. Hecker
*Attorney, Agent, or Firm*—Joseph H. Smith; Ronald E. Grubman

[57] ABSTRACT

An optical erasable thermally addressed, liquid crystal information storage and retrieval system is disclosed having an information density and the order of $10^7$ bits/cm² while using liquid crystal cell thickness of relatively standard dimensions ($\sim 10$ μm). The system includes two substrates containing a smectic-A phase liquid crystal medium, and several thin filing attached to the substrates for establishing the proper conditions within the liquid crystal medium for creating a radiation scattering defect which is small in size ($<1.0$ μm), and for performing erase functions in conjunction with an optical beam. A device according to the invention has an array of such defects in the liquid crystal medium representing information bits, with the array having a ratio of the shortest distance between individual defects to the thickness of the liquid crystal medium of less than 0.4, for a liquid crystal medium having thickness larger than 5 microns.

13 Claims, 7 Drawing Figures

LIQUID CRYSTAL INFORMATION STORAGE AND RETRIEVAL SYSTEM

BACKGROUND OF THE INVENTION

In recent years, computer systems have exhibited major advances in speed and in miniaturization at significant reduction in cost. Concurrent with these advances have been major efforts to develop information storage and retrieval systems which are also low cost and still compatible with the high speeds with which these new systems operate. Much of this effort has been directed toward the development of optical memory devices because of their rapid write time (>1 Mbit per second), rapid access time (<0.1 sec.), high density ($\gtrsim 10^8$ bits per sq. in.), and low cost (<$10^{-4}$ cents per bit). (See Kenney, et al., IEEE Spectrum, pages 33-38, February 1979.) To date, numerous types of materials have been developed for optical discs; however, most of these have the disadvantage of storing information permanently; i.e., they cannot be erased or edited. (See Bartolini, et al., Optical Engineering, 15(2), 99 (1976).)

Materials which are exceptions to this general rule appear to fall into the following classifications: certain thermoplastics, photochromics, chalcogenides, magnetooptical materials, photoferroelectric materials, photoconductive/electrooptical materials and electrooptic materials. However, each of these has significant disadvantages. For example, thermoplastics such as polyvinylcarbazole/polystyrene require a pre-exposure corona charge. In addition, they use surface relief storage which has a relatively low contrast ratio, a long erase time, difficulties in local erase, and a short lifetime (typically ~100 cycles). Photochromics such as spiropyrane typically require blue or ultra-violet light for write and/or erase and hence are not compatible with present semiconductor lasers. Furthermore, most photochromics are subject to fatigue, which severely limits cycle lifetime, and the stored data tends to fade in just a few minutes. Chalcogenides such as TeAsGe typically exhibit a low cycle lifetime (~10 cycles) and have a relatively low contrast ratio for erasable media. Magnetooptical materials such as the rare earth iron garnets usually require an external magnetic field. Materials with the largest magnetooptical effects (garnets) require micro-patterning to get high density storage and have high optical insertion loss. Photoferroelectric materials such as $Bi_4Ti_3O_{12}$ require single crystals which are difficult to prepare in large areas. Large area photoferroelectrics can be fabricated as ceramic materials but the ceramics are subject to fatigue. Photoconductive/electrooptic materials such as $Bi_{12}SiO_{20}$ have limited data storage times, on the order of several hours, and also require large single crystals. Electrooptic materials such as $LiNbO_3$ also require single crystals and stored information is erased during readout unless the image is thermally fixed whence another thermal treatment is required for erasure.

The use of liquid crystal materials, particularly smectic liquid crystals is well known in the prior art for certain display devices, and some stationary memory systems have been developed which use this media for information storage. (See U.S. Pat. No. 3,796,999 entitled LOCALLY ERASABLE THERMO-OPTIC SMECTIC LIQUID CRYSTAL STORAGE DISPLAYS and Dewey, et al., STD 77 Digest 108 (1977).) However, despite continued research over the last ten years to achieve ever higher information density in liquid crystal light valves, the perceived practical limitations of these devices have all but eliminated their widespread use in electronic data processing memory applications where, to be competitive, information densities of the order of $10^7$ bits/cm$^2$ are required. One of the primary reasons for this is that it has generally been believed that the spatial resolution of electro-optical effects in these devices is of the same order of magnitude as the cell thickness (see J. D. Margerum and L. J. Miller, J. Colloid and Interface Sci. 58, 3(1977)). Furthermore, independent analytical and experimental work has tended to confirm this perception in the specific case of thermally addressed smectic light valves, where the information is encoded in the form of radiation scattering defects in an otherwise non-scattering background. (See A. G. Dewey, "Projection Storage Displays Using Laser-Addressed Smectic Liquid Crystals," in The Physics and Chemistry of Liquid Crystal Devices, G. Sprokel, ed., Plenum Press, 1980, Pgs. 219-238.) For such defects to be useful in carrying information, the prior art would indicate that these defects would have to be essentially independent, i.e., a disturbance of one defect does not destroy information carried by adjacent defects. Hence, it would be expected that the highest useful defect density would be obtained with an array of isolated defects, each defect corresponding to a single domain. Further, for high resolution and a high quality non-scattering texture, the smectic-A liquid crystal should be homeotropically aligned in the bulk. Under these conditions, it would be expected that the single domains thus created would correspond to the parabolic focal conics discussed by Rosenblatt, et al., J. Physique 38(a), 1105 (1979). These parabolic focal conics form domains extending through the cell thickness and exhibit polygonal arrays on the cell surface. The size of these domains would define the defect density and for the special case considered in Rosenblatt (id. at 1110) the focal length, f, the cell thickness, t, and the domain width, d (the width of the parabola at the surface), can be shown to be related by the following expression:

$$f = d^2/8t$$

Experimental results on smectic-A samples of cyanobenzylidene octyloxyaniline (CBOOA) exhibited focal lengths ranging from 1.3 μm to 2.9 μm, which when used with above analytical expression to estimate domain sizes, corresponds to a range of approximately 11 μm < d < 17 μm for a 12 μm thick layer, and 4 μm < d < 7 μm for a 2 μm thick layer, or more generally d~t. In addition, using smectic materials other than CBOOA, for example, leads to substantially the same results.

In terms of information density, a domain width of 11 μm corresponds to approximately $10^6$ bits/cm$^2$ and a domain width of 4 μm corresponds to approximately $10^7$ bits/cm$^2$. Hence, to achieve information densities suitable for optical computer memory applications requires very thin liquid crystal layers, of the order of 2 μm or less. Although such cells have been produced, (see A. D. Jacobson, et al., SID Int. Symp. Dig. 6, 26 (1975)), the practical problems associated with maintaining uniformity of spacing at such thicknesses have severely restricted their use. As an example of these problems, 0.5 inch thick polished optical flats have been required as substrates just to maintain uniformity of spacing over fields as small as 1 in.×1 in. for 2 μm thick cells. Not only are such cells expensive to produce, but such substrate thicknesses can seriously interfere with the resolution of the optical systems which are required to achieve the small spot sizes needed for high density storage. Furthermore, in large area cells, uniform liquid crystal layer thickness is quite difficult to achieve with just perimeter type spacers even with liquid crystal layers as thick as 25 μm. Hence, special techniques have had to be developed to insure uniformity, including, for example, the addition of small glass beads of the appropriate size to the liquid crystal medium, and insertion of intermediate spacers.

For all of these reasons, and despite large research and development programs continued over many years by many companies, practical inexpensive liquid crystal light valves have not been developed with information densities approaching $10^7$ bits/cm$^2$, densities such as would be practical in electronic data processing memories or in very high resolution display devices.

SUMMARY OF THE INVENTION

In accordance with the illustrated preferred embodiments, the present invention provides an optical, erasable, liquid crystal information storage and retrieval system. The system includes two substrates containing the liquid crystal medium, preferrably a smectic-A material, and several thin films attached to the substrates for establishing the proper conditions within the liquid crystal medium for achieving the desired small "spot" (or defect) size and for performing erase functions in conjunction with an optical beam. Writing onto the cell is accomplished by locally heating the liquid crystal with a pulsed, optical beam or array of beams to create radiation scattering defects forming the desired bit pattern.

Despite all indications to the contrary from the prior art described in the Background, a system according to the preferred embodiments can achieve spot diameters of less than 1.0 microns, essentially independently of the thickness of the liquid crystal medium. In addition, the system is capable of consistently providing a ratio of spot spacing to liquid crystal thickness of less than 0.4 for crystal thickness over 5 microns. For practical reasons, however, crystals thicker than about 15 microns are seldom used. Hence, for liquid crystals with thicknesses of the order of 10 microns (an easily constructed production size), stable center-to-center spot spacings of less than 4 microns can be readily achieved. This corresponds to an information density of approximately $10^7$ bits/cm$^2$ for an array of square domains. Furthermore, limitations in this regard are not presently inherent in the liquid crystal medium, but are a function of the absorbing materials and beam focusing.

In contrast to the prior art, these information densities do not require tight control over cell thickness, so that substrate thickness can be reduced. A reduction in substrate thickness results in shorter working distances in the optical systems; hence, smaller lenses and less massive systems can be used. This enables the optical system to be more easily tailored to the needs of high speed computer memory systems.

With this system, individual data bits can be written and erased with laser pulses on the order of 50 ns at power levels commensurate with high duty cycle semiconductor diode lasers. A temperature storage range of −10° C. to 40° C. is easily achievable with commercially available liquid crystal mixtures, and with special mixtures a much wider range can be achieved. The system has the capability of liquid crystal cell sizes of up to the square foot range, limited primarily by technological considerations. Furthermore, the device has long term spot stabiliy of the order of years.

DETAILED DESCRIPTION OF THE INVENTION

Figure 1:
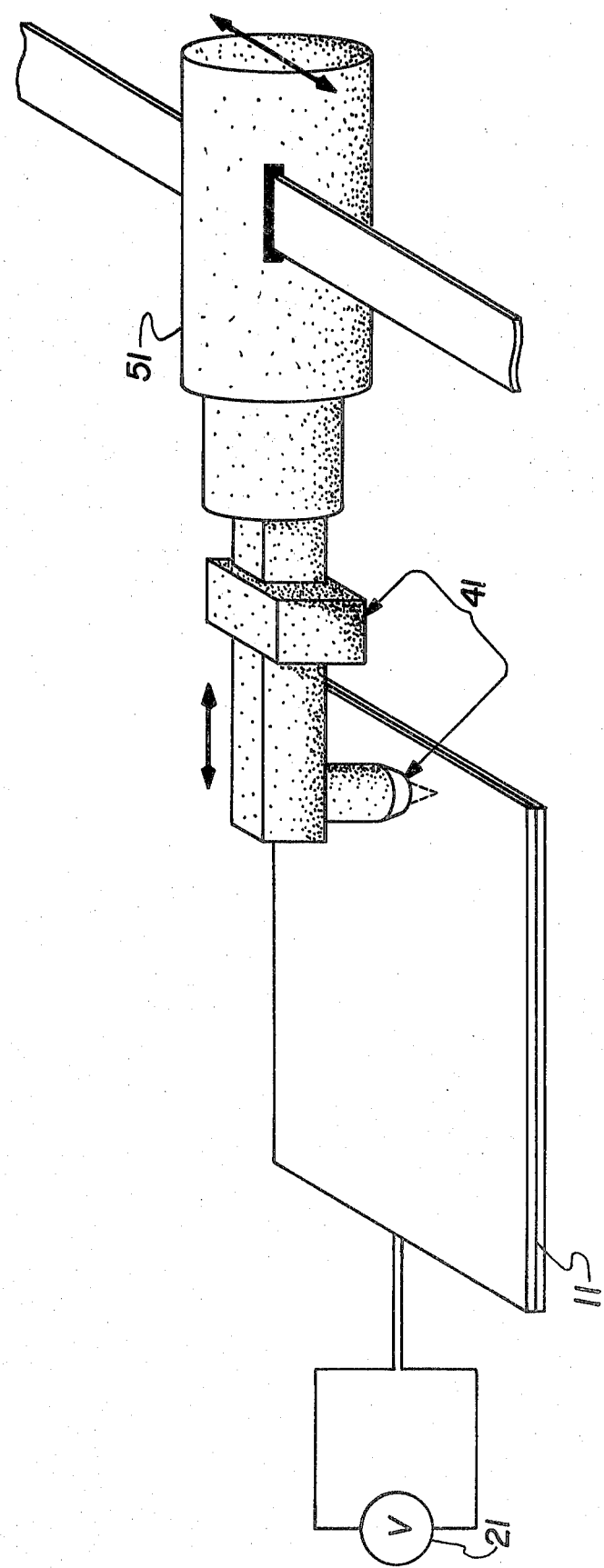
FIG. 1 is a schematic illustration of an optical liquid crystal information storage and retrieval system.

Illustrated in FIG. 1 is an optical liquid crystal information storage and retrieval system, hereinafter called a memory system. It includes a liquid crystal memory (LCM) 11 typically ranging from 2 to 200 square inches in area, and from 1 mm to 13 mm in thickness. The preferred liquid crystal medium used in LCM 11 is typically smectic-A in phase. A generator 21 is provided to supply appropriate voltages across LCM 11. Also illustrated are an optical system 41 and an optics translator 51. Optical system 41 converts electrical signals to optical signals and vice versa and is used to write and read onto and off the LCM 11. Optical system 41 is also used in conjunction with generator 21 to locally erase LCM 11. Optics translator 51 moves the optical system to the appropriate location on LCM 11 and mediates between it and a control device such as digital computer (not shown). Translator 51 also mediates between the control device and optical system 41. (For convenience of notation, the last digit "1" of an element number corresponds to the first embodiment and any subsequent embodiments where that element remains unchanged. Other final digits then correspond to those elements which were changed on a particular embodiment, e.g., last digit "3" corresponds to the element which was changed on the third embodiment.)

Figure 2:
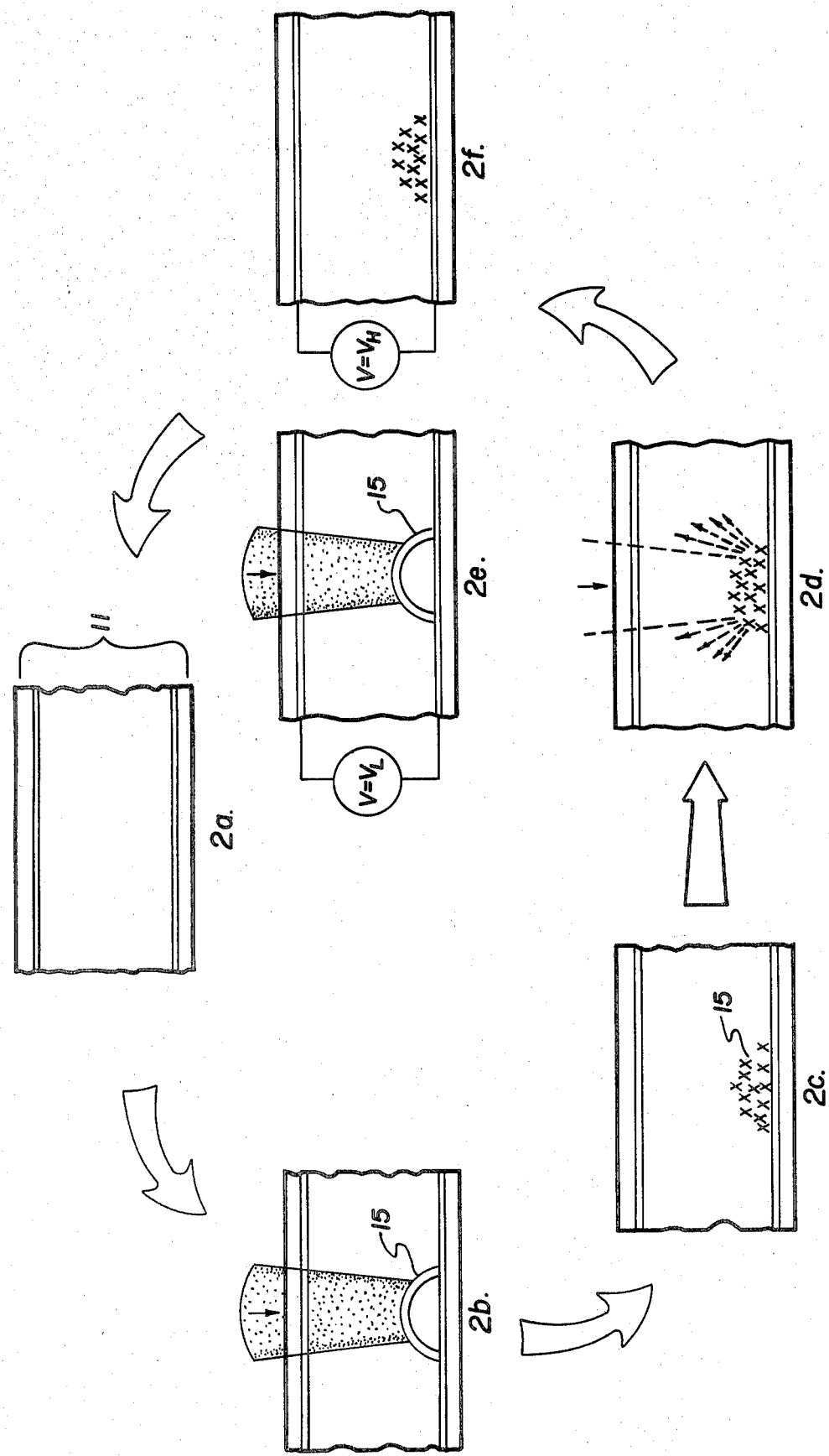
FIG. 2 is a flow sheet depicting the various states of the liquid crystal medium shown by cross-sections of a liquid crystal cell.

In practice, the method for reading, writing and erasing LCM 11 is well known in the art. As illustrated in FIG. 2a, initial conditions are established wherein LCM 11 contains a smectic liquid crystal in a non-scattering or unwritten configuration so that it is transparent at the ambient operating temperature. Writing is accomplished by selectively heating small areas of the crystal to the isotropic state, typically with a laser, and rapidly cooling back into the smectic state, thereby creating scattering centers 15 in those regions which were locally heated (see FIGS. 2b and 2c). The effect of writing is thus to create a pattern of spots (or bits) on an otherwise non-scattering background. Reading is accomplished by illuminating the liquid crystal (at a much reduced power level relative to the writing function) and observing the scattered radiation to determine the bit pattern (see FIG. 2d). Two kinds of erasing procedures are available, one for local erase (FIG. 2e), and the other for erasure of the entire memory (FIG. 2f). For local erase the local area is heated to the isotropic state and allowed to cool while applying a relatively low voltage (the magnitude being geometry and material dependent). Total erasure of the memory can be accomplished in several ways, all of which are well known in the art; for example, by heating the liquid crystal medium to the isotropic state and allowing it to cool back to the ordered (non-scattering) state in the presence of an electric field, or by subjecting it to a large uniform electric field.

Figure 3:
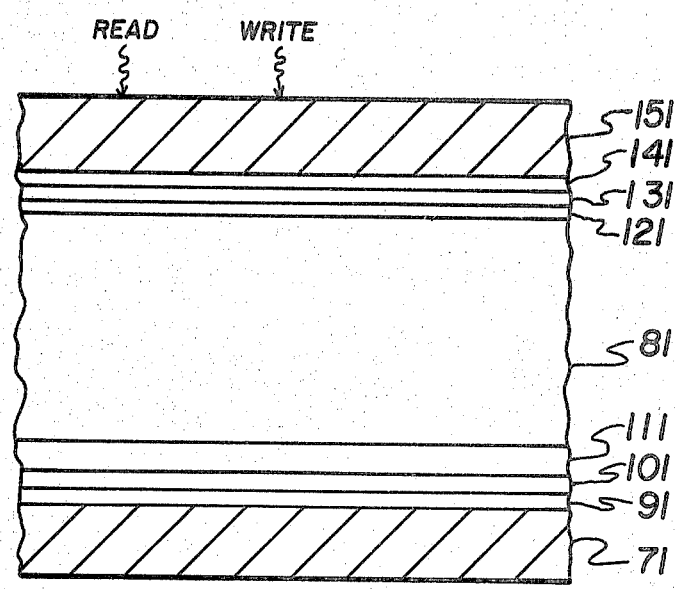
FIG. 3 is a cross-section of a preferred embodiment of liquid crystal cell.

FIG. 3 shows a cross-section of a preferred embodiment of LCM 11. In this embodiment, light for both reading and writing functions is incident from above. As shown, LCM 11 includes two substrates 71 and 151, which together with spacers and sealing material (not shown) contain the liquid crystal medium between the substrates. Clearly, substrate 151 must be transparent to the incident radiation used for reading and for writing. Substrates 71 and 151 are typically of the order of 1.5 mm to 2 mm in thickness, but can be thicker or thinner depending on the desired optical quality of the surfaces. Several suitable materials for the substrates are soda lime glass, polymethyl methacrylate or fused quartz. Many other materials could also be used provided their optical quality is controllable. Another aspect of this embodiment is that both substrates need not be made of the same material, e.g., only upper surface 151 need be transparent. The liquid crystal medium (LC) 81 contained by substrates 71 and 151 is typically smectic-A. Suitable materials for LC 81 would be a mixture of alkyl and alkoxy cyanobiphenyls, such as those called "S1" and "S2" available from BHD Chemicals Ltd. In this particular embodiment, LC 81 is of the order of 10 microns in thickness; in general the minimum thickness of the liquid crystal material is determined by the characteristic size of scattering defects in the medium, the liquid crystal dielectric properties and the limitation of fabrication methods for obtaining uniform thickness and molecular orientation. Clearly, the optimal thickness will vary from one material to the next.

In order to enter information into and retrieve information from the memory, proper conditions must be established within the liquid crystal relative to the writing and reading devices. In the embodiment of FIG. 3 these conditions are established by using several layers of thin films attached to substrates 71 and 151, six such films being shown. Film 111 is an alignment-passivation layer, typically in the range of 50-2000 Å in thickness. Examples of suitable materials for film 111 would be spun-on polyimide or plasma deposited $SiO_2$. The minimum thickness of film 111 is determined by the minimum amount of material required to obtain uniform liquid crystal alignment, while the maximum thickness is typically limited by the requirement of good thermal communication between LC 81 and film 101. In this particular embodiment, film 111 serves to preferentially align the liquid crystal molecules in a direction parallel to the surface of the film. (In another embodiment, a different direction may be preferred.) This film, being an insulator, also serves to inhibit charge transport between the liquid crystal and the electrode-absorber-reflector layer, film 101; i.e., film 111 also serves a passivation function. In this particular embodiment, film 101, the electrode-absorber-reflector layer, may typically be a glassy metal such as 20% Tungsten, 40% Nickel and 40% Tantalum by weight, although the composition could vary significantly depending on which function, absorber or reflector, is desired to be optimized. Acting as an electrode, film 101 along with transparent electrode 141 serves to provide an electric field across the liquid crystal cell to establish the initial non-scattering state in LC 81 and to provide the erase functions discussed earlier. As an absorber, film 101 absorbs incident radiation from the writing system, converting it to heat. As a reflector, film 101 reflects incident radiation used in the reading system back through the liquid crystal and into the reading optics.

Film 91 is a heat control layer which serves to control the distribution of heat conducted from film 101 to the liquid crystal, relative to the heat conducted from film 101 to the substrate. It also serves to control the heat distribution within the liquid crystal itself. The thickness of the heat control layer ranges from 0.1 $\mu$m to 5 $\mu$m in this particular embodiment, but could vary more widely depending on the desired heat distribution, the material used for the layer, the power density of the incident radiation, and the desired spot size. Suitable materials for the heat control layer are polyimide, $SiO_2$, or even a metal such as aluminum if it were desired to quickly absorb the heat from film 101 and spread it over a larger area.

Film 121 is an alignment layer for aligning the liquid crystal molecules. Film 121 should be optically transparent and typically 50 Å to 1000 Å in thickness. Suitable materials include silane coupling agents, polyimides, and inorganic films such as SiO. Film 131 is another passivation layer to prevent charge transfer between the liquid crystal and the electrode 141. A typical material for film 131 would be a transparent insulator such as polyimide. Clearly film 131 could also serve as an alignment layer as does film 111, thereby eliminating film 121. However, the use of a separate film 121 illustrates that the chosen alignment directions on the upper and lower surfaces are decoupled and need not be same. Film 141 is a transparent electrode, typically of the order of 1000 Å in thickness, suitable materials including $In_{2-x}Sn_xO_3$, and Sb doped $SnO_3$.

Figure 4:
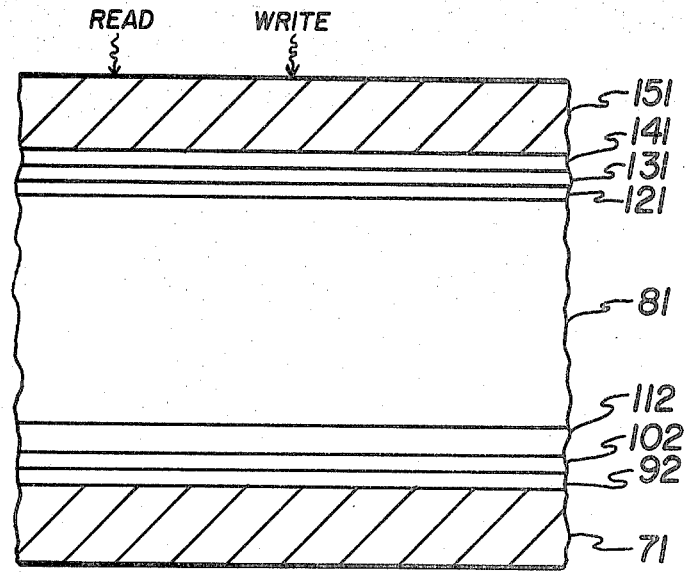
FIG. 4 is a cross-section of another preferred embodiment of the liquid crystal cell.

FIG. 4 illustrates a cross-section of a second embodiment of the liquid crystal memory. In this embodiment, the description and function of elements 71, 81, 121, 131, 141, and 151 are as in the first embodiment depicted by FIG. 3. Again radiation for reading, writing, and erasing functions is incident from above. In this second embodiment, film 92 is a heat control layer and an electrode. In addition it acts in conjunction with reflection control coating 102 as an absorber for the write and erase function and as a reflector for the read function.

In this embodiment, film 92 may be a metal such as aluminum of approximately 300 Å in thickness. In this embodiment as in each of the others, an important consideration in selecting the material for the heat control layer is the desired temperature profile in both space and time within the liquid crystal.

The specifics of the reflection control layer 102 are dependent on the index of refraction of the material used in film 92, the wavelength of the radiation used for the read, write, and erase functions, and the relative absorbance/reflectance desired for the read, write, and erase functions. For an aluminum film 92, a read, write, and erase wavelength of 850 nm, and a 50/50 split in absorbed and reflected light, a suitable material for film 102 would be $TiO_2$ approximately 1000 Å thick. Clearly, if another material such as gold were used for film 92, the thickness of film 102 would likewise vary. Also, it may be desirable to use a multilayer reflection control film such as a combination of $MgF_2$ and $CeF_3$, especially if a two wavelength read-write system is contemplated. Film 102 may also be an insulator, and hence serve as a passivation layer as well.

Film 112 is an alignment layer, similar to film 111 of the first embodiment, except that film 112 does not also serve a passivation function. Clearly, the physical characteristics of film 112 must be compatible with other materials in the cell, and are especially important when designing film 102. Suitable materials for film 112 are silane coupling agents or polymides, although most materials used in the first embodiment for film 111 would also be useful in this second embodiment.

Figure 5:
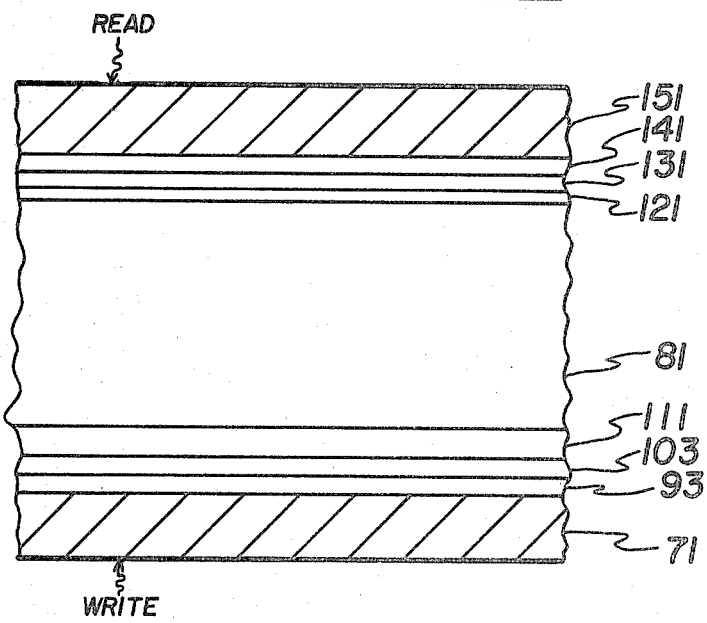
FIG. 5 is a cross-section of yet another preferred embodiment of the liquid crystal cell.

FIG. 5 depicts a cross-section of a third embodiment of the liquid crystal which is configured so that radiation for reading is incident from above and radiation for writing and erasing is incident from below. In this embodiment, elements 71, 111, 81, 121, 131, 141, and 151 are as in the first embodiment which is depicted in FIG. 3, except that both substrates 71 and 151 must be transparent. In this third embodiment, film 103 is an electrode, reflector, and absorber, and absorber, typically of a metal such as aluminum of the order of 1000 Å to 2000 Å in thickness. Film 93 is an antireflection coating designed to optimize the absorption by film 103 of radiation incident from below. For a glass substrate 71 and film 93 of aluminum with incident radiation at 850 nm, a typical antireflection coating would be a three layer sandwich such as 1030 Å of $TiO_2$, 1550 Å of $MgF_2$, and 875 Å of $TiO_2$.

As can be seen from the above three embodiments of the liquid crystal memory, the various films can perform multiple functions. Just as the number of films were reduced by combining several functions into one film, it may also be possible to further reduce the number of films by appropriately doping the liquid crystal medium so that it becomes its own absorber. Additional embodiments will also occur to those skilled in the art.

Figure 6:
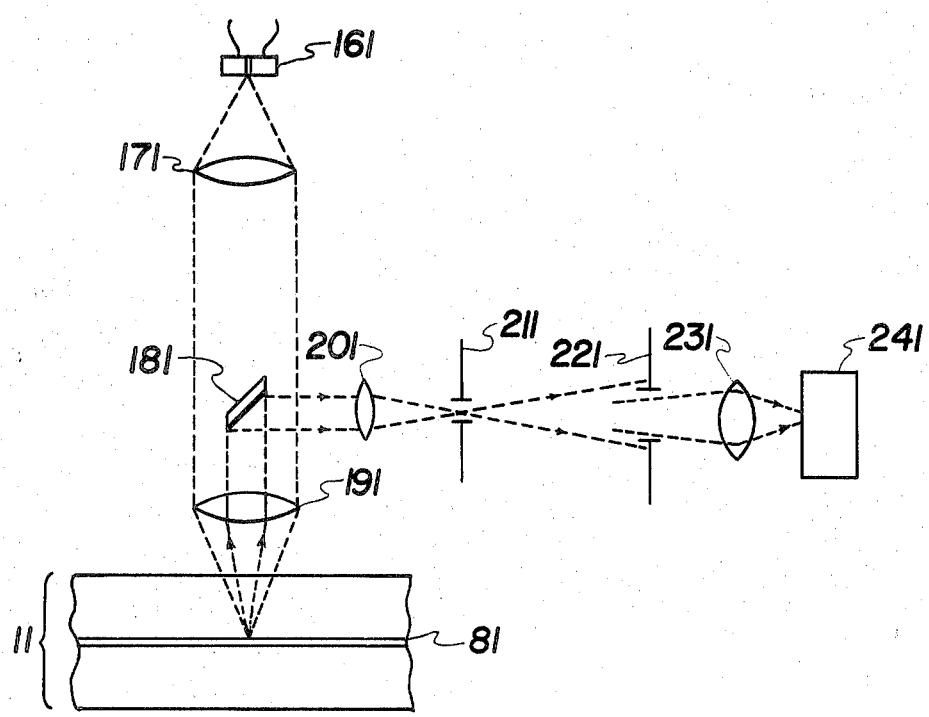
FIG. 6 is a schematic illustration of a dark field optical system used to perform read-write-erase functions in an optical liquid crystal memory system.

FIG. 6 depicts a dark field read-write-erase optical system which can be used with the first and second liquid crystal memory embodiments above (optical system 41 of FIG. 1). The system typically includes a pulsed light source, in this case a laser 161, a collimator/beam expander 171, a dark field stop/collector mirror 181 for blocking the central field and reflecting the scattered radiation, and a final objective 191 for focusing the beam onto the absorber layer of liquid crystal medium 11. The imaging optics includes lens 201 which images the radiation reflected from 181 through the spatial filter 211 onto an image filter 221, image filter 221 removing the diffraction image of 181. A focusing lens 231 focuses the scattered light onto a detector system 241.

Figure 7:
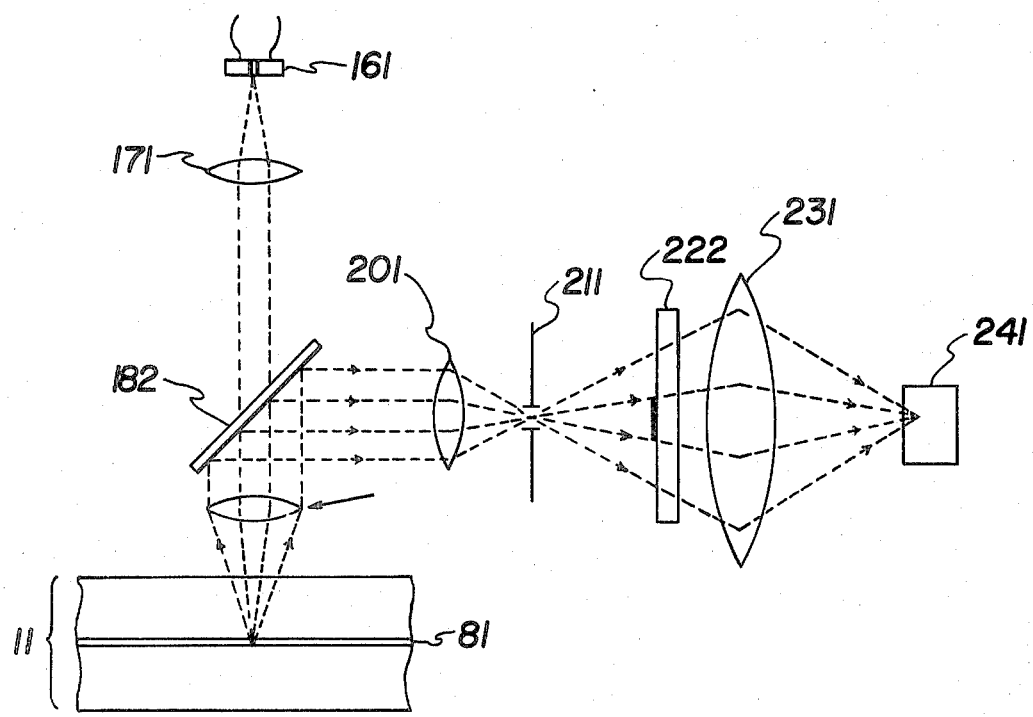
FIG. 7 is a schematic illustration of an inverted dark field optical system used to perform read-write-erase functions in an optical liquid crystal memory system.

FIG. 7 depicts an inverted dark field read-write-erase system which can also be used with the first and second liquid crystal memory embodiments above. In this system, the dark field stop collector mirror 181 of FIG. 6 is replaced by a hole-coupled dark field mirror 182 for imaging the central portion of the beam onto the absorber layer of the liquid crystal medium 11, i.e., the central beam is not blocked as in FIG. 6. The radiation scattered out of the central beam is then imaged onto the detector 241 substantially as in FIG. 6, except that image filter 221 is replaced by image filter 222 which has a central stop.

In the third preferred embodiment of the liquid crystal memory shown in FIG. 5, it is possible to optimize both the the reading and writing system independently. For example, the reading system would be optimized by using a dark field optical system as described above in FIG. 6, with a direct focused beam on the opposite side for writing and erasing. In this third embodiment, some care is required to insure alignment of the reading and writing systems for proper track identification and following.

In each of the above optical systems and liquid crystal embodiments, spot sizes of less than 1 $\mu$m are easily achieved. Furthermore, the radiation scattering defects produced with the above systems result in stable center-to-center spot spacings as small as 2 $\mu$m. For many applications, however, reading accuracy is improved as the spot spacing is increased because less resolving power is required and because larger spot sizes can be used to increase the relative contrast between written and unwritten areas. Hence, the choice of spot size and spot separation could vary considerably depending on the particular embodiment envisioned and is likely to be a trade-off between maximum information density and the desired signal to noise ratio. However, to be useful in a computer memory, spot spacings should probably not exceed 6 $\mu$m in order to provide adequate information densities. In any case, a ratio of defect spacing to cell thickness of less than 0.4 can be readily obtained over a range of liquid crystal thicknesses from about 5 $\mu$m up to and including the practical maximum of about 15 $\mu$m. In this range the ratio of 0.4 provides an adequate information density to be used in high density optical memory applications.

Clearly, there are innumerable variations in the read-write-erase optical system depending on the particular focusing and imaging systems, the spot size desired, the operating wavelength of the lasers used, and the degree to which the system is optimized either for reading or writing. In practice, the optical system also includes an automatic focus adjustment intimately related to the optics translator 51 of FIG. 1, to compensate for variations in critical optical distances due to lateral run-out, warpage, and cell thickness variations. Procedures for such focusing are well known in the art, for example, as described in U.S. Pat. No. 4,051,529 entitled FOCUS CONTROL SYSTEM WITH MOVABLE MIRROR, and in U.S. patent application Ser. No. 120,589 filed Feb. 11, 1980 entitled DYNAMIC FOCUS ADJUSTMENT FOR TRANSMISSIVE OR REFLECTIVE OPTICAL DISC MEMORY SYSTEM assigned to present assignee, and references described therein.

While in the preferred embodiments described above, the differences in optical scattering from ordered and disordered textures have been the primary mode for information-storage in the liquid crystal medium, other optical properties could also be applied to this function in a memory device, e.g. different optical polarization properties with respect to the polarizations of the incident radiation, differential absorption characteristics, or even luminescence could be utilized. Similarly, the use of patterned layers could also prove beneficial in the context of a liquid crystal memory. For example, patterned heat control layers would enable better control of the heat distribution in both space and time. Similarly, patterned electrodes could be used to reduce problems with capacitive reactance, thereby achieving faster switching times, or they could be used to totally erase sectors rather than the entire memory. Patterning might also be used for track following and track identification purposes. Other properties of liquid crystals could also be beneficial, for example, photoconductor addressed liquid crystals could be used to reduce the required laser power for the writing and erasing functions. Furthermore, writing functions should not be restricted to optical systems alone. Other radiation sources entirely, e.g., particle beam devices, may eventually prove beneficial in achieving smaller defect size.

What is claimed is:

1. An information storage device comprising:
   confinement means for confining a liquid crystal medium;
   a liquid crystal medium confined by said confinement means, said liquid cystal medium being in the smectic-A phase and having an approximately uniform thickness of more than 5 microns; and
   an array of defects in said liquid crystal medium representing information bits, the ratio of the shortest distance between individual defects to the thickness of the liquid crystal medium being less than 0.4, with said defects having a maximum size of 6 microns.

2. A device as in claim 1 further comprising:
   at least two electrodes on said device;
   alignment means for aligning said liquid crystal medium; and
   absorber means for absorbing a portion of radiation incident thereon.

3. A device as in claim 2 further comprising heat control means for controlling the relative distribution of energy conducted from said absorber means to said liquid crystal medium and from said absorber means to said confinement means.

4. A device as in claim 3 further comprising reflector means for reflecting a portion of radiation incident thereon.

5. A device as in claim 4 wherein said confinement means further comprises two substrates between which said liquid crystal medium is sandwiched.

6. A device as in claim 5 wherein:
   said electrodes are located opposite each other with said liquid crystal medium therebetween; and
   said alignment means and absorber means, are comprised of at least one film located between said substrates.

7. A device as in claim 6 wherein said heat control means comprises at least one film located between said liquid crystal medium and at least one of said substrates.

8. A device as in claim 7 wherein said reflector means comprises at least one film located between said liquid crystal medium and at least one of said substrates.

9. A device as in claim 1, 3, 7, or 8 further comprising a first means for at least one of writing information bits onto said liquid crystal medium, reading information bits which are stored on said liquid crystal medium, and erasing individual bits of information which are stored on said liquid crystal medium.

10. A device as in claim 9 wherein said first means further comprises a radiation source and a focusing means for focusing radiation from said radiation source onto said absorber means.

11. A device as in claim 10 wherein said first means is further comprised of an imaging means for imaging radiation scattered from said liquid crystal medium.

12. A device as in claim 11 wherein said imaging means is further comprised of a dark field optical system.

13. A device as in claim 11 wherein said imaging means is further comprised of an inverted dark field optical system.

* * * * *

UNITED STATES PATENT AND TRADEMARK OFFICE
CERTIFICATE OF CORRECTION

PATENT NO. : 4,396,997

DATED : August 2, 1983

INVENTOR(S) : Frederic J. Kahn, Henryk Birecki and Robert A. Burmeister

It is certified that error appears in the above—identified patent and that said Letters Patent is hereby corrected as shown below:

Column 2, line 51, "and 4 µm<-" should read -- and 4 µm< --;

Column 6, line 52, "function" should read -- functions --;

Column 8, line 57, "e.g." should read -- e.g., --;

Signed and Sealed this

Twenty-second Day of January 1985

[SEAL]

Attest:

DONALD J. QUIGG

Attesting Officer

Acting Commissioner of Patents and Trademarks